T. B. Stout,
Washing Machine,
N° 69,507. Patented Oct. 1, 1867.
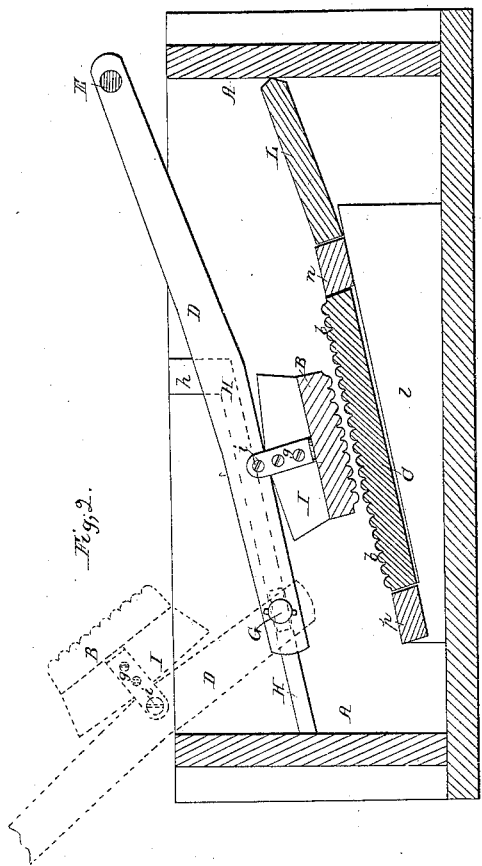
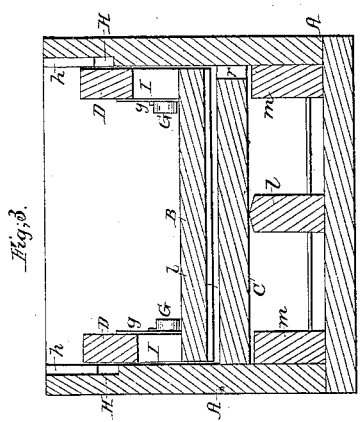
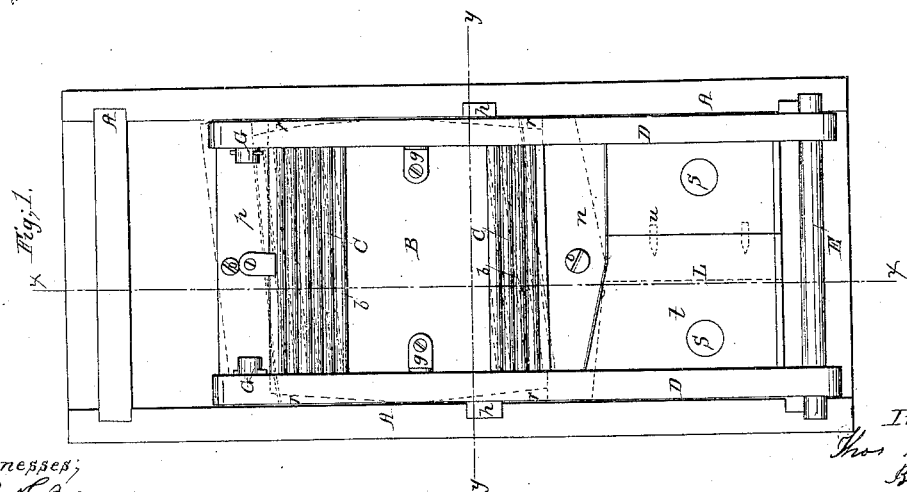
Witnesses;
Thos. S. Parker
E. J. Brown.
Inventor;
Thos. B. Stout
By his atty.
J. S. Brown

United States Patent Office.

THOMAS B. STOUT, OF KEYPORT, NEW JERSEY.

*Letters Patent No. 69,507, dated October 1, 1867.*

---

IMPROVED WASHING MACHINE.

---

*The Schedule referred to in these Letters Patent and making part of the same.*

---

TO ALL WHOM IT MAY CONCERN:

Be it known that I, THOMAS B. STOUT, of Keyport, in the county of Monmouth, and State of New Jersey, have invented an improved Washing Machine; and I do hereby declare that the following is a full and exact description thereof, reference being had to the accompanying drawings, making part of this specification—

Figure 1 being a top view of this machine.

Figure 2, a longitudinal vertical section thereof in a plane indicated by the line $x\ x$, fig. 1.

Figure 3, a transverse vertical section thereof in a plane indicated by the line $y\ y$, fig. 1.

Like letters designate corresponding parts in all of the figures.

Let A represent an oblong box of any desired size and proportions. It may be supported on legs or a bench in any ordinary manner. The washing machine is of that kind which has a corrugated or fluted rubber, B, which is moved forward and backward over a stationary corrugated or fluted wash-board, C, situated on or over the bottom of the box. First, my rubber B is secured at its two ends respectively to two side levers, D D, which are connected at their upper ends by a round, E, that also serves as a handle for operating the rubber. The lower ends of the levers are provided respectively with pivot-pins G G, which may turn freely in the levers, and which turn or slide in grooves or ways H H in the inner surfaces of the sides of the box. These ways are entered by vertical openings or extensions $h\ h$ to the upper edges of the box, whereby the rubber can be taken out of and again inserted into the box when desired. The ways are generally oblique, as shown, so that the action may be suited to the wash-board below, and to the position of the operator. It will be seen that the levers and rubber by this arrangement can be turned up on end out of the way, as indicated by red lines in fig. 2, resting by the pivots G G in the grooves H H, so that the use of the rubber is very convenient; and the rubber can be raised and lowered to suit the thickness or quantity of clothes, and the pressure regulated at all times by the hands. The pivots G G act as guides for the levers and centres, on which they turn and produce a leverage on the rubber, so that any amount of pressure can easily be produced upon the clothes, and yet the rubber is perfectly free, and can be used as lightly as can be desired. Thus it is adapted to both the heaviest and lightest and most delicate fabric. The rubber is secured to the levers by means of two blocks, I I, at the ends, and two hinge-straps, $g\ g$, secured to the blocks and rubber, but pivoting on screws or pins $i\ i$ on the levers D D, substantially as shown. The upper edges of the blocks I I are rounded somewhat, and thus a rocking movement of the rubber forward and backward under the levers is allowed for the purpose of equalizing the pressure upon the clothes underneath as the rubber passes over the wash-board. Any equivalent means of effecting the rocking movement may be employed. The wash-board C rests at its middle on a bar, $l$, running lengthwise of the box, and being rounded or ridged a little in the centre, so that the wash-board may turn or rock from side to side freely. The wash-board is supported at its sides by bars or stops $m\ m$ a little lower than the middle bar $l$, as seen in fig. 3, so that the wash-board may have a rocking movement sidewise to a greater or less extent. The supporting bars may be inclined, so as to give the wash-board any inclination desired. The wash-board is held in place at the upper and lower edges by two cross-bars, $n$ and $p$, which turn on pivots $o\ o$ in the middle, and the side edges $r\ r$ of the wash-board are rounded or tapered toward the front and rear edges, substantially as shown, so that its angle can be changed to a certain extent, and either bring the flutings or corrugations $b\ b$ of the board exactly parallel with the transverse flutings in the rubber above, as indicated in black lines, or be placed a little oblique thereto, as indicated by red lines in fig. 1. The object of this change is to bring the flutings of the rubber and wash-board parallel, so that one set will bear into the other, and produce more powerful friction and rubbing for coarse and dirty clothes, and to prevent this intermatching of the flutings so as to diminish the friction when washing fine and delicate articles. By this arrangement I find that when using the oblique arrangement of the flutings I can wash old and delicate articles without injury, and yet with the parallel arrangement of the flutings the coarsest, thickest, and dirtiest articles can be effectually washed. The changing of the angle of the wash-board is readily effected by raising the soap-board L, which has finger-holes $s\ s$ in it to enable it to be handled readily, when the cross-bars $n\ p$ and wash-board can be easily turned to the position required, and then, replacing the soap-board, turning it upside down, since, one side up, it suits one position of the wash-board, and the other side up it suits the other position thereof, as indicated by black and red lines in fig. 1. The soap-board locks the position of the upper cross-bar $n$ by pressing or wedging down between it and the end of the box. It is made in two parts, $t$ and $u$, connected by dowels, so that one part may be removed if desired in order to reach the water underneath, as indicated by red lines in fig. 1. The advantage of the side-rocking or adjustment of the wash-board is that it adapts the clothes to the rubber, whether thicker on one side or not, equalizing the pressure, and causing all parts of the clothes to be operated on. This self-adjustment at right angles to the self-adjustment of the rubber fulfills all the requirements of that nature.

In other washing machines, the moving rubber of which has a fixed centre, the pressure is produced by some means which is uniform in action, and therefore cannot suit every case, and it often moves forward and backward over the same parts of the clothes, rubbing them unnecessarily, unless moved about by hand. But as the pressure of my rubber is produced by the hands, in my machine it can be regulated to suit every case. The clothes having been soaped on the soap-board, by lifting the rubber and drawing it toward the operator, the clothes can be caught by it and carried down as far as he may choose, and when that portion has been washed, by lifting the rubber and drawing it toward himself again, the operator can catch hold of another portion of the clothes, and carry them down as before until the clothes have been thus entirely washed, and, if necessary, one can raise the rubber and shove it from him and catch the clothes, and thereby draw them up at pleasure, to be washed over again if desired. Thus, in a similar manner, the clothes are moved forward and backward on the bottom wash-board by the rubber until every part is clean; hence my machine in this respect has the advantage over any other washing machine, since, also, one can see how he is washing any particular part, so that any part can be washed as much as and no part more than necessary.

What I claim as my invention, and desire to secure by Letters Patent, is—

The rubber B, having a vibrating or self-rocking movement, and arranged and operating substantially as and for the purpose herein specified.

I also claim the wash-board C, rocking or self-adjusting sidewise, in combination with the rocking movement of the rubber B, at right angles thereto, substantially as and for the purpose herein set forth.

I also claim the adjustment of the wash-board so as to bring its flutings or corrugations either parallel with or oblique to those of the rubber, substantially as and for the purpose herein specified.

THOMAS B. STOUT.

Witnesses:
EUGENIA STOUT,
MARCUS B. TAYLOR.